M. BIRKIGT.
CONTROL DEVICE FOR SPRING MOUNTED MEMBERS.
APPLICATION FILED JAN. 10, 1921.

1,437,220.

Patented Nov. 28, 1922.

Inventor
Marc Birkigt
By
Attorney

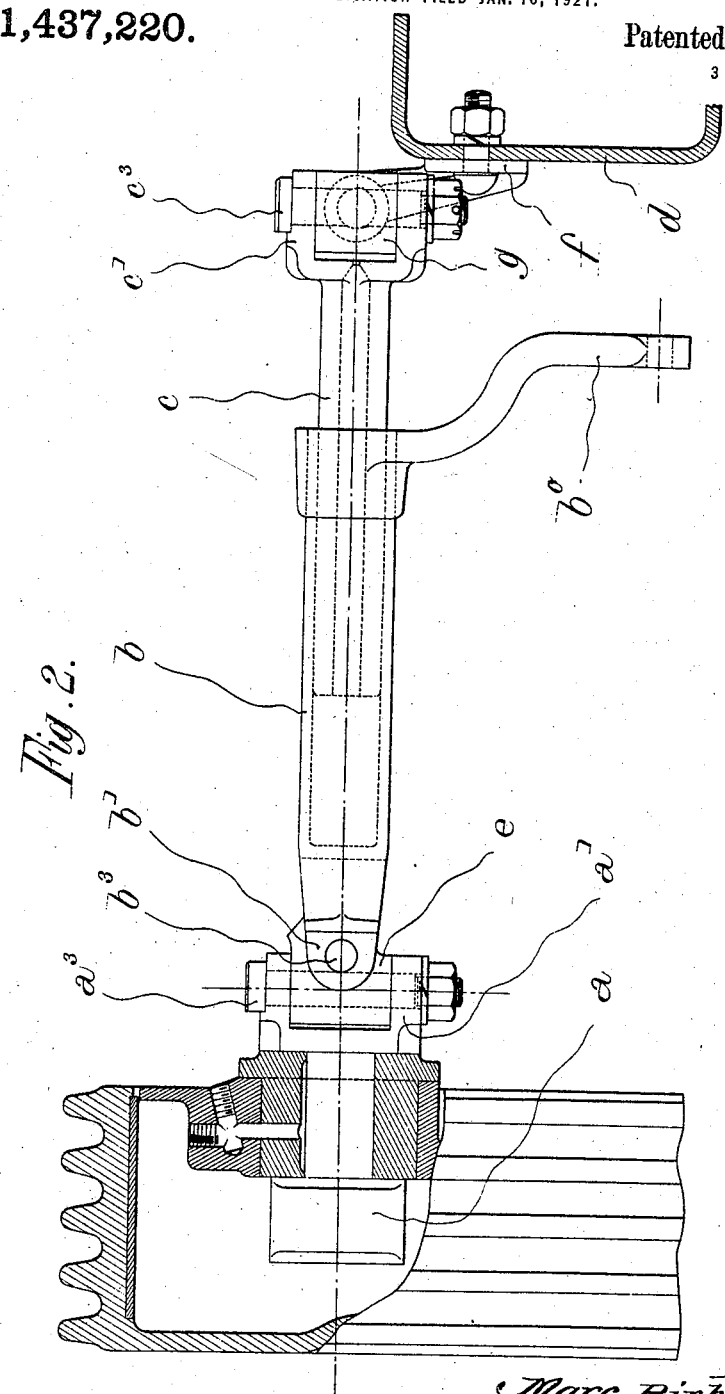

M. BIRKIGT.
CONTROL DEVICE FOR SPRING MOUNTED MEMBERS.
APPLICATION FILED JAN. 10, 1921.
1,437,220.
Patented Nov. 28, 1922.
3 SHEETS—SHEET 3.
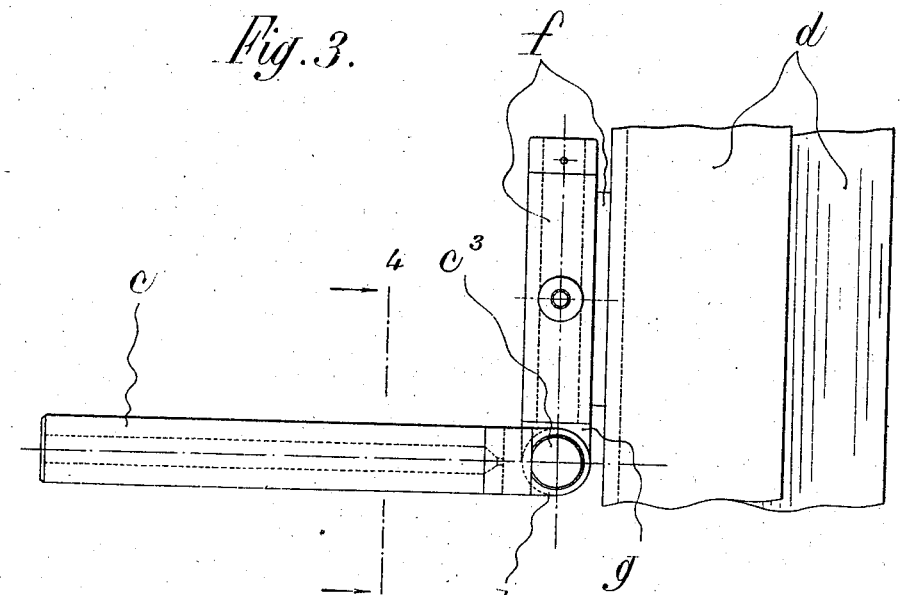
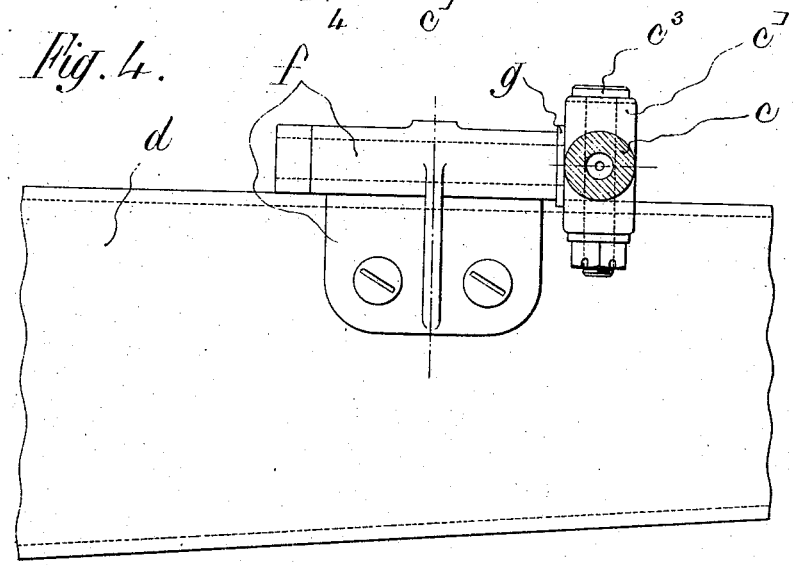
Inventor
Marc Birkigt
By
Attorney Patented Nov. 28, 1922.

1,437,220

UNITED STATES PATENT OFFICE.

MARC BIRKIGT, OF BOIS-COLOMBES, FRANCE.

CONTROL DEVICE FOR SPRING-MOUNTED MEMBERS.

Application filed January 10, 1921. Serial No. 436,278.

*To all whom it may concern:*

Be it known that I, MARC BIRKIGT, engineer, citizen of the Republic of Switzerland, residing at Bois-Colombes, Department of Seine, France, have invented certain new and useful Improvements in Control Devices for Spring-Mounted Members, of which the following is a specification.

This invention relates to control devices for spring-mounted members, and more particularly but not exclusively to devices of the present class which are used in motor vehicles having steering wheels provided with brakes, for controlling said brakes, since such devices appear to offer the greatest interest for the application of the present invention.

The object of the invention is more especially to constitute control devices which in addition to the advantages obtained by the most improved devices hitherto employed, shall afford the added advantage of permitting a more ready installation or assemblage, securing at the same time a great strength against wear of the parts, thus permitting the working members to maintain their exactness of operation for a greater length of time.

The invention consists in constituting (as is already known, especially by the French Patent No. 427488, of March 17, 1911) the part of the control device of the present class which is connected to the spring mounted member by a shaft connected at each end by universal joints respectively to the spring-mounted member and to the part which supports the spring system, and provided with such means that the distance between the end of the shaft connected to the spring mounted member and the said support can be varied at will; and in constituting the said means by the shaft itself which is made telescopic to this effect.

Aside from this principal disposition, the invention consists in the use of various other arrangements preferably employed at the same time and which will be hereafter specified.

The invention refers more particularly to certain methods of application and construction of the said arrangements or dispositions.

The invention is further set forth in the following description and in the accompanying drawings which are given merely by way of example.

Fig. 2 shows in cross section according to line 2—2, Fig. 1, with parts in elevation and parts taken away the same vehicle frame.

Figs. 3 and 4 represent respectively in plan and in section according to line 4—4 of Fig. 3, certain members of the foregoing device.

Figure 1:
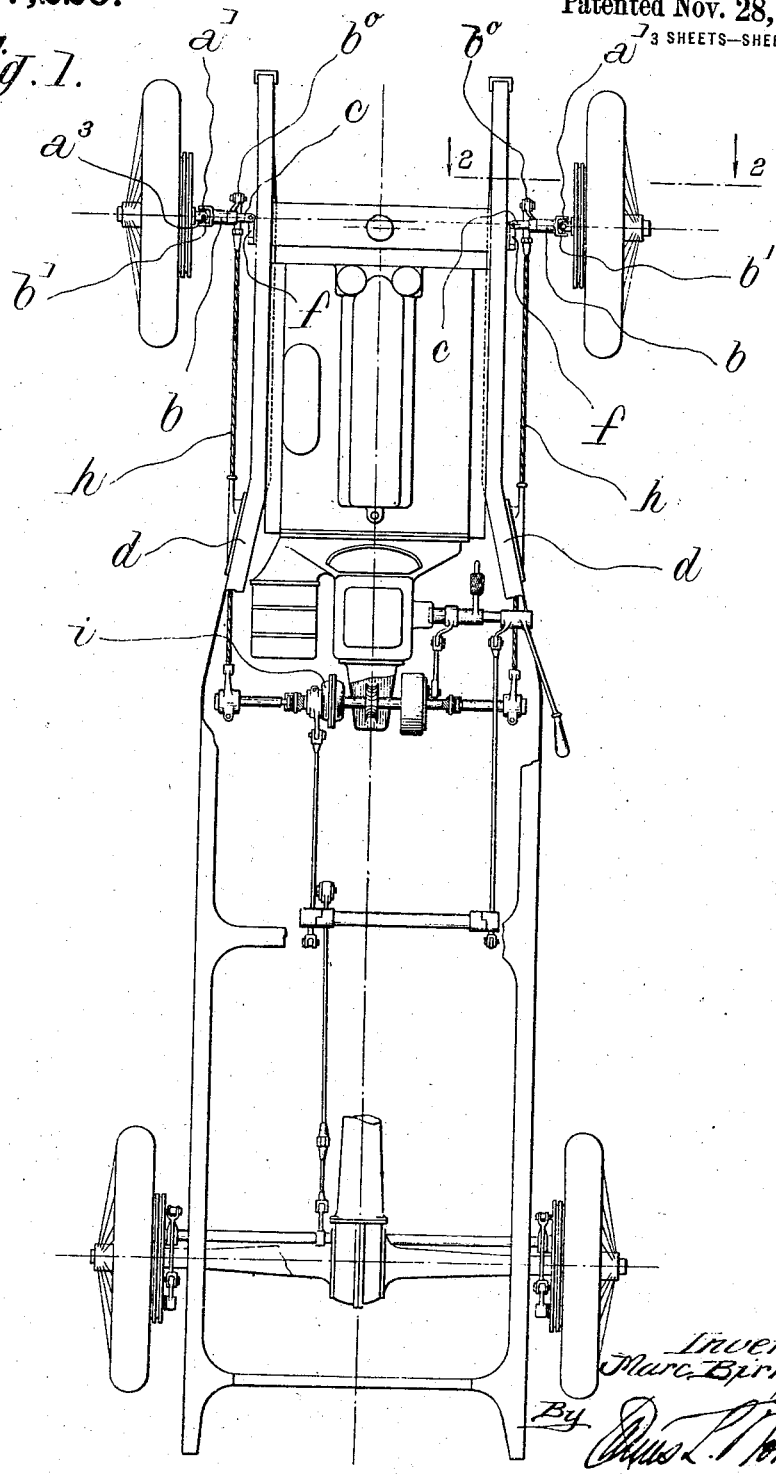
Fig. 1 shows a diagrammatic plan view on a relatively small scale with various parts broken away of a motor vehicle frame with the front or steering wheels provided with brakes, which latter are provided with a controlling or operative device according to the invention.

According to the invention, and more particularly according to preferred methods of applying and executing the same, supposing that, whilst constructing a motor vehicle with front or steering wheels carrying drum brakes with interior shoes, it is desired to provide such vehicle with a controlling device for operating the said brakes, this can be carried out by the following or analogous method.

As regards the device to be used in conjunction with the eccentric $a$ of each of the said brakes, there is employed among other constituent parts a pair of shaft members $b$ and $c$ which together form a telescopic shaft adapted to be interposed between the corresponding eccentric $a$ and the corresponding side rail of the automobile frame, $d$, in such manner as to be disposed, at least when the vehicle is stationary and the wheels not steered, in a transverse plane including the axis of the said eccentric, and for this reason the second of these shaft members (the one situated farthest from the corresponding eccentric $a$) is of solid metal or simply bored with a hole for lubrication, the shaft having a relatively great length, while the first shaft member is made hollow and allows the second shaft to enter it to a great depth and to slide therein with easy friction.

On the other hand, the said telescopic shaft is connected at one end, and by a universal joint, with the corresponding eccentric $a$, and at the other end and also by universal joint, with the desired point on the corresponding side rail of the frame, and for this purpose each of the said extremities is provided preferably with a coupling fork $b^1$ or $c^1$; the said eccentric also carries a similar coupling fork $b^1$ $a^1$, this latter being connected to the fork through a cross-shaped part $e$ mounted to rotate upon these forks in such manner that the forks and the cross-shaped member shall constitute a universal joint; the shaft members $b$ and $c$ are so disposed that in addition to the above, they can rotate with relation to each other about their common axis. Upon the side rail $d$ is journaled a block $g$ by means of a bracket $f$, the axis of the block being parallel to the side rail; the said block is adapted to be disposed between the branches of the fork $c^1$ and to be journaled in this fork; a universal joint is thus constituted by the said fork together with the block $g$ and the shaft member $c$ by the reason that the said shaft is disposed to rotate in the shaft member $b$. This assemblage can be constituted in the best manner by giving a relatively wide spacing to the branches of the various forks $a^1$, $b^1$ and $c^1$, as well as corresponding dimensions to the arms of the cross-shaped piece $e$ and to the block $g$, and a relatively great length to the shaft or pin of this latter, and also to affect the trunnion mounting of the said arms and block, not by the use of trunnions properly so-called which form extensions of the arms and the block and engage within the holes of the forks, but by the use of the pins $a^3$, $b^3$ and $c^3$ passing through these holes and through holes of corresponding diameter in the arms and block, and in such manner as to afford the greatest possible bearing surfaces to all the parts.

A lever $b^0$ is disposed upon the said shaft member $b$ for the purpose of effecting the rotation of the latter upon the second shaft member $c$; this lever is preferably mounted on the end of the shaft $b$ which lies farthest from the end carrying the fork $b^1$, the lever being also curved in order to remove its end still farther away from the fork.

As concerns the means which are to be provided for controlling or operating the previously mentioned assemblage, such means can be constituted in any suitable manner, and preferably by the device represented in Fig. 1, in which two cables $h$ are attached respectively to the ends of the two levers $b$ of the said assemblage, and connected together as well as to the said controlling means through an assemblage of members comprising a differential system $i$, in such manner that the two brakes shall act with the same power when they are operated.

By the use of the foregoing there is obtained an assemblage which will operate at least as well as the most improved devices of the present class, and even better than these latter, by reason of the relatively great liberty possessed by the ecce tric controlling shaft as concerns displacement upon its axis. The operation still holds good even if the center of each cross-piece $e$ should not be situated upon the axis of rotation of the system comprising the journal of the corresponding wheel. Moreover, the present method involves a simpler and hence a more economical construction, also affording better protection against entrance of dust or other foreign bodies, ease of lubrication, durability, while the exactness of operation of the working parts is maintained to its fullest extent.

It will be of course understood from the foregoing that the invention is not limited to any of the operative or constructional methods hereinbefore indicated in a special manner, but on the contrary it includes all alternative forms, and more particularly the form in which the invention is applied as in the foregoing description.

I claim:—

1. In combination with a control device for spring mounted members, means for operating said control device consisting of a shaft connected thereto at one end by a universal joint and at its other end by a universal joint to a fixed support, said shaft consisting of two longitudinally telescopic members.

2. In combination with a control device for spring mounted members, means for operating said control device consisting of a shaft connected thereto at one end by a universal joint and at its other end by a universal joint to a fixed support, said shaft consisting of two longitudinally telescopic members and a lever connected to and extending radially from one of said telescopic members.

In testimony whereof I have hereunto set my hand.

MARC BIRKIGT.